(12) United States Patent
Goumain et al.

(10) Patent No.: US 7,061,201 B2
(45) Date of Patent: Jun. 13, 2006

(54) SYSTEM FOR CONTROLLING THE SPEED OF A MOTOR OF AN ELECTRIC FAN UNIT, NOTABLY FOR AN AUTOMOBILE HEATING AND/OR AIR CONDITIONING INSTALLATION

(75) Inventors: Xavier Goumain, Montigny le Bretonneux (FR); Jean Gatinois, Jouars Pontchartrain (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 11/072,770

(22) Filed: Mar. 4, 2005

(65) Prior Publication Data
US 2005/0194919 A1 Sep. 8, 2005

(30) Foreign Application Priority Data
Mar. 5, 2004 (FR) .................................. 04 02329

(51) Int. Cl.
*G05B 318/599* (2006.01)
(52) U.S. Cl. ........................... 318/599; 363/26; 363/41
(58) Field of Classification Search ............... 318/599, 318/50, 161, 254, 138, 439, 434; 363/26, 363/41; 361/236
See application file for complete search history.

(56) References Cited
U.S. PATENT DOCUMENTS

| | | | | |
|---|---|---|---|---|
| 3,971,972 A | * | 7/1976 | Stich | 318/811 |
| 4,329,630 A | * | 5/1982 | Park | 318/258 |
| 4,556,827 A | * | 12/1985 | Erdman | 318/254 |
| 5,180,964 A | * | 1/1993 | Ewing | 323/222 |
| 5,446,366 A | * | 8/1995 | Bassett et al. | 323/222 |
| 5,552,976 A | * | 9/1996 | Munro et al. | 363/39 |
| 5,811,948 A | * | 9/1998 | Sato et al. | 318/434 |
| 6,166,500 A | * | 12/2000 | Makaran | 318/254 |
| 6,459,324 B1 | * | 10/2002 | Neacsu et al. | 327/379 |
| 6,727,129 B1 | * | 4/2004 | Nakajima | 438/197 |
| 6,825,632 B1 | * | 11/2004 | Hahn et al. | 318/599 |
| 6,831,441 B1 | * | 12/2004 | Navalon Carretero | 318/800 |
| 2004/0100150 A1 | | 5/2004 | Goser et al. | |

FOREIGN PATENT DOCUMENTS

| | | |
|---|---|---|
| DE | 44 29 733 | 3/1995 |
| EP | 0 250 036 A | 12/1987 |
| EP | 0 493 185 A | 7/1992 |
| EP | 0 687 056 A | 12/1995 |

* cited by examiner

*Primary Examiner*—Rita Leykin
(74) *Attorney, Agent, or Firm*—Ronald Courtney

(57) ABSTRACT

The invention relates to a system for controlling the speed of a motor (1) of an electric fan unit comprising a field-effect transistor (3) that controls the motor (1) using pulse-width modulation, the field-effect transistor (3) being connected to a circuit (5) comprising a voltage source (7) and a resistive element (9) in series, the circuit (5) is connected between the gate (G) of the field-effect transistor (3) and a second source (S2) that is connected to a first source (S1) of the field-effect transistor (3), via an inductor (11) in order to allow a reduction in the slope of the current as the field-effect transistor (3) switches.

14 Claims, 3 Drawing Sheets

SYSTEM FOR CONTROLLING THE SPEED OF A MOTOR OF AN ELECTRIC FAN UNIT, NOTABLY FOR AN AUTOMOBILE HEATING AND/OR AIR CONDITIONING INSTALLATION

BACKGROUND OF THE INVENTION

The invention relates to a system for controlling the speed of a motor of an electric fan unit. The field of application is notably that of heating and/or air conditioning installations, in particular for automobiles.

For such applications, a known solution is to produce an electric fan unit of the type comprising a volute casing, a turbine mounted inside the volute casing for generating an air flow within the latter, a turbine drive motor, and a control module for the motor comprising a control system that allows the speed of the motor to be varied according to the requirements.

Usually, the speed control system for the motor of an electric fan unit comprises an field-effect transistor of the MOS type operating in pulse-width modulation (PWM) mode.

However, pulse-width modulation generates abrupt variations in voltage and current causing electromagnetic interference commonly called EMC.

One problem to be solved is therefore the reduction of this electromagnetic interference.

For this purpose, it is known that this reduction depends, amongst other things, on the slope of the current as the field-effect transistor switches.

FIGS. 5A and 5B show two conventional examples of speed control systems for a motor 101 comprising a field-effect transistor 103.

FIG. 5A shows that a circuit 105, comprising in series a source of voltage 107 of value V and a resistive element 109 of resistance Rg, is connected between the gate G and the source S of the field-effect transistor 103.

A power supply source 115 is connected to the drain D of the field-effect transistor 103 and to a terminal of the motor 101. The other terminal of the motor 101 is connected to the source S of the field-effect transistor 103. In addition, a flywheel circuit 113 is connected across the terminals of the motor 101.

In this case, the switching current I through the field-effect transistor 103 depends on the resistance Rg and on an intrinsic capacitance Cgs of this field-effect transistor 103, according to the following formula:

$$I = \frac{V}{Rg \times Cgs} \times t,$$

where t is time.

Thus, the slope P of the current is given by the following formula:

$$P(Rg, Cgs) = \frac{V}{Rg \times Cgs}$$

Consequently, an increase in the value of the resistance Rg reduces the slope P of the current and also that of the voltage as the field-effect transistor switches.

However, the reduction in the voltage and current slopes generates thermal losses that could diminish the reliability and the performance of the field-effect transistor 103.

Moreover, the intrinsic capacitance Cgs varies from one component to another owing to the manufacturing tolerances of these components. This capacitance variability from one transistor to another causes differences in the level of electromagnetic interference from one product to another. This is unacceptable for an automobile manufacturer.

In order to reduce the effect of the intrinsic capacitance, a usual solution consists in adding a capacitor.

Indeed, FIG. 5B shows a control system similar to that in FIG. 5A but where a capacitor 117 of capacitance Cgk is added between the gate G and the source S of the field-effect transistor 103.

Thus, according to the control system in FIG. 5B, the slope P of the current as the field-effect transistor 103 switches is given by the following formula:

$$P(Rg, Cgs, Cgk) = \frac{k}{Rg(Cgs + Cgk)}$$

According to this formula, the reduction in the slope of the current is controlled by an increase in the capacitance Cgk.

However, an increase in the capacitance Cgk generates a power dissipation in the resistance Rg. Thus, a large value of capacitance Cgk could degrade or even destroy the resistive element 109, thus limiting the performance of the capacitance Cgk for controlling the slope of the current. The size of the couple formed by the capacitance Cgk and resistive element 109 is therefore a limiting factor.

Furthermore, the variation in the intrinsic capacitance Cgs from one component to another always leads to a significant variability in the current slope, which in turn causes a large dispersion in the level of electromagnetic interference from one product to another.

AIM AND SUMMARY OF THE INVENTION

The aim of the invention is to provide a speed control system for a motor having minimal electromagnetic interference.

For this purpose, a subject of the invention is a system for controlling the speed of a motor of an electric fan unit comprising a field-effect transistor that controls the motor using pulse-width modulation, the field-effect transistor being connected to a circuit comprising a voltage source and a resistive element in series, characterized in that said circuit is connected between the gate of the field-effect transistor and a second source that is connected to a first source of the field-effect transistor, via an inductor in order to allow a reduction in the slope of the current as the field-effect transistor switches.

Accordingly, the inductor allows both the slope of the current to be reduced and the impact of the intrinsic capacitance of the field-effect transistor on the slope of the current to be rendered negligible, thus greatly diminishing the electromagnetic interference.

According to a first variant, the system comprises a flywheel circuit connected between ground and the second source of the field-effect transistor, the drain of said field-effect transistor being connected to a power supply source.

According to a second variant, the system comprises a flywheel circuit connected between a power supply source and the drain of the field-effect transistor, the second source of said transistor being connected to ground.

Advantageously, the motor is connected across the terminals of the flywheel circuit.

As an example, the value of the inductor is in the range 5 nH to 30 nH.

Preferably, the inductor is formed by a printed circuit board routing between the first source and the second source of the field-effect transistor. The length of the track of the printed circuit board routing can be in the range 5 mm to 30 mm.

According to one feature of the invention, the inductor can be created by an electronic component. The electronic component can be a current measurement shunt.

Advantageously, the system comprises a capacitor connected between the gate and the second source of the field-effect transistor.

As an example, the field-effect transistor can be of the MOS type.

Two other subjects of the invention are a control module for an electric fan unit and also a heating and/or air conditioning installation for automobile, comprising a speed control system such as the above.

BRIEF DESCRIPTION OF THE DRAWINGS

The invention will be better understood upon reading the description presented below by way of non-limiting example and making reference to the appended drawings in which.

DETAILED DESCRIPTION OF EMBODIMENTS OF THE INVENTION

Figure 1:
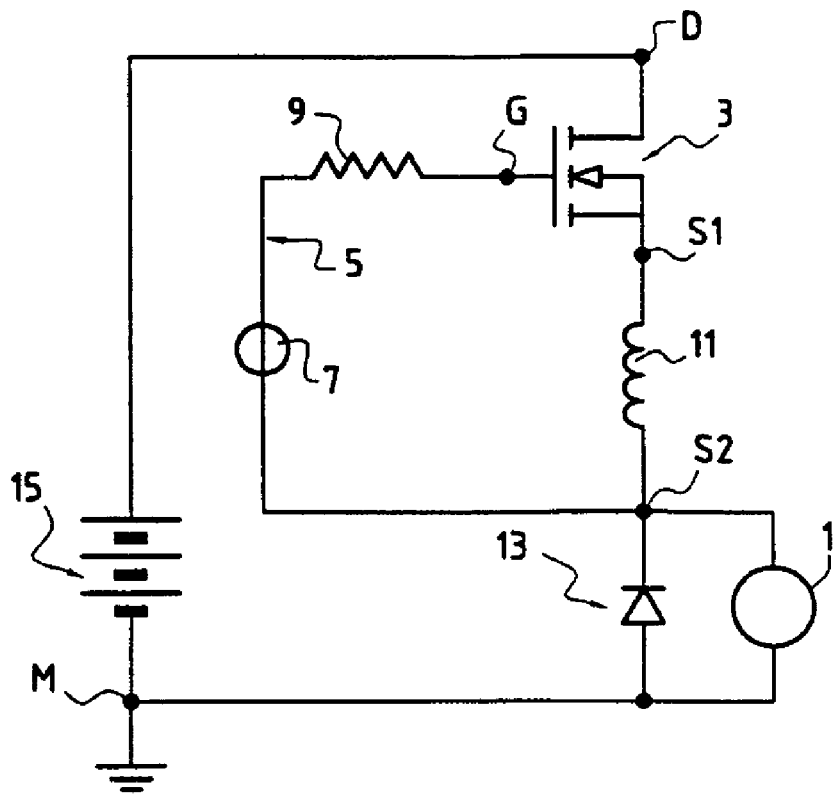
FIG. 1 is a highly schematic view of a speed control system of a motor of an electric fan unit comprising a field-effect transistor controlling the motor by pulse-width modulation, according to the invention.

FIG. 1 shows, highly schematically, a speed control system of a motor 1 of an electric fan unit comprising a field-effect transistor 3 controlling the motor 1 by pulse width modulation.

According to the invention, the field-effect transistor 3, for example of the MOS type, is connected to a circuit 5 comprising a source of voltage 7 of value V and a resistive element 9 of resistance Rg mounted in series. This circuit 5 is connected between the gate G of the field-effect transistor 3 and a second source S2 that is connected to a first source S1 of the field-effect transistor 3, via an inductor 11 of value L.

A power supply source 15 is connected to the drain D of the field-effect transistor 3 and to a terminal of the motor 1. The other terminal of the motor 1 is connected to the second source S2 of the field-effect transistor 3.

The control system also comprises a flywheel circuit 13 connected between ground M and the second source S2 of the field-effect transistor 3, such that the motor 1 is connected across the terminals of this flywheel circuit 13. The flywheel circuit 13 comprises, for example, a diode or another field-effect transistor playing the role of a diode.

The field-effect transistor 3 operates as an on/off switch. Thus, when the transistor 3 is conducting, the current delivered by the power supply source 15 flows through the field-effect transistor 3 and the motor 1.

On the other hand, when the transistor 3 is turned off, a residual current in the motor 1 flows through the flywheel circuit 13.

According to this example, the slope P of the current as the field-effect transistor 3 switches depends on the resistance Rg, on an intrinsic capacitance Cgs of the field-effect transistor 3, on the value of the inductor L multiplied by a parameter s defining the transconductance of the field-effect transistor 3 and on a calculation constant k. This slope P of the current is given by the following formula:

$$P(Rg, Cgs, L) = \frac{V1}{L \times s + Rg \times Cgs}$$

As the above formula shows, it is observed that the slope P depends on an additional parameter that allows, on the one hand, this slope to be modified and, on the other, the impact of the capacitance Cgs to be reduced.

Thus, the inductor L allows the slope of the current to be reduced as the field-effect transistor 3 switches.

Moreover, the value of the inductor L renders the impact of the intrinsic capacitance Cgs of the field-effect transistor 3 on the slope of the current negligible, reducing the electromagnetic interference even further, and therefore the dispersions of electromagnetic fields from one module to another are reduced in consequence.

Another advantage is the fact that, for the same slope, it is possible to increase the value of the inductor L and to reduce the resistance Rg, thus reducing the power dissipation by the latter as the field-effect transistor 3 switches.

Generally speaking, a low value of inductance is sufficient for a significant reduction in the electromagnetic interference.

Thus, the inductor 11 can be formed by a routing on a printed circuit board, in other words a conducting track, advantageously made of copper, formed on the printed circuit board, between the first source S1 and the second source S2 of the field-effect transistor 3.

By way of example, a routing in the range from around 5 mm to 30 mm generates an inductance in the range from around 5 nH to 30 nH which is sufficient for a significant reduction in the electromagnetic interference.

It will be noted that, below 5 nH, the effect of the inductance is too small, and above 30 nH, the inductance will create switching losses in the transistor that may become significant, leading to abnormal heating of the component and therefore to its degradation.

Furthermore, the inductor 11 can be created by the parasitic inductance of an electronic component that is already part of the motor control system. The electronic component can be a low-resistance shunt that, by means of a comparator, allows the current in the motor to be measured.

Figure 2:
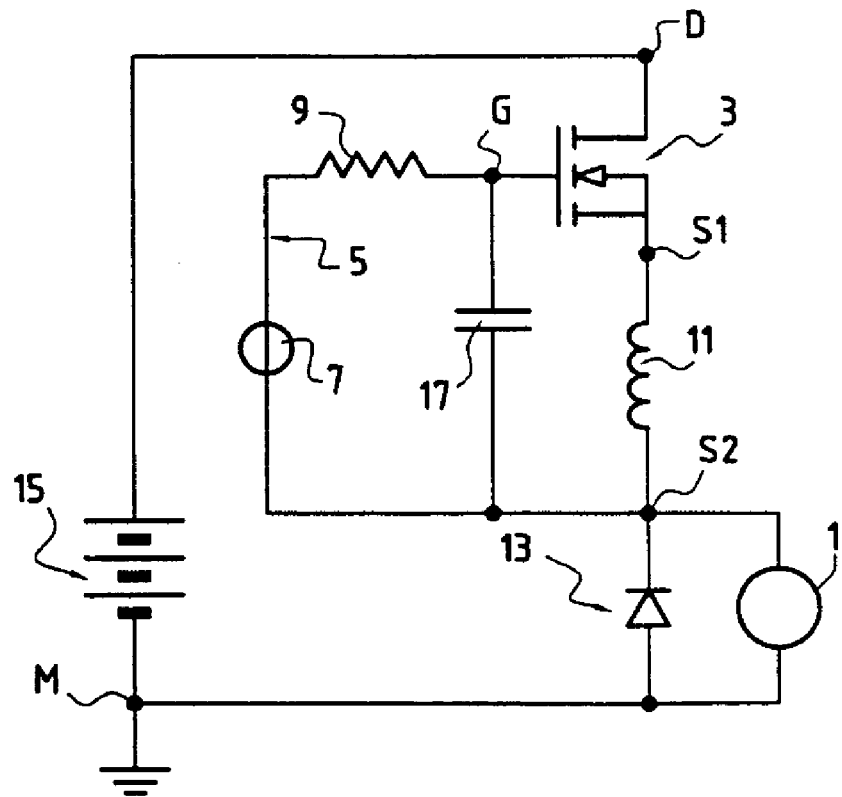
FIG. 2 is another embodiment that differs from FIG. 1 in that it comprises a capacitor.

FIG. 2 is another embodiment that differs from FIG. 1 in that it comprises a capacitor 17, of capacitance Cgk, connected between the gate G and the second source S2 of the field-effect transistor 3.

In this case, the first order slope P of the current as the field-effect transistor 3 switches depends on the resistance Rg, on the capacitance Cgk, on the value of the inductor L and on a calculation constant k.

This first order slope P does not depend on the intrinsic capacitance Cgs of the field-effect transistor 3 and is given by the following formula:

$$P(Rg, Cgk, L) = \frac{kVl}{L \times Rg \times Cgk}$$

Thus, in addition to the value of the inductor L, the capacitor Cgk allows the slope of the current as the field-effect transistor 3 switches to be reduced in an appropriate manner.

In addition, in a first approximation, the slope P does not depend on the intrinsic capacitance Cgs thus eliminating any impact of this intrinsic capacitance Cgs of the field-effect transistor 3 on the slope of the current.

Figure 3:
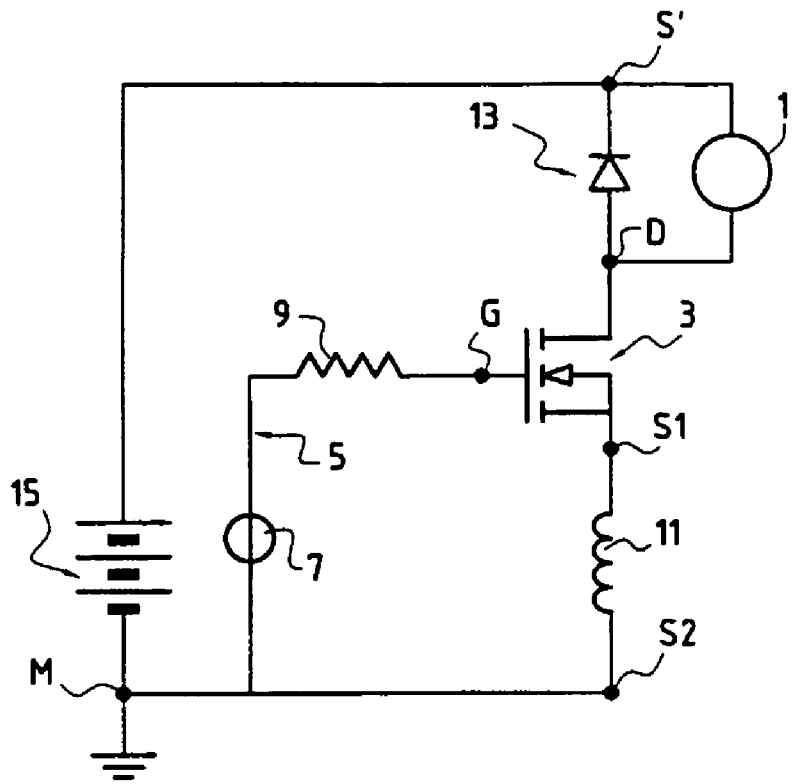
FIG. 3 is a variant of FIG. 1.

In a variant of FIG. 1, illustrated in FIG. 3, the flywheel circuit 13 is connected between the power supply source 15 and the drain D of the field-effect transistor 3. On the other hand, the second source S2 of the field-effect transistor 3 is connected to ground M. Here, it will be understood that the invention is just as applicable to a 'high-side' circuit as to a 'low-side' circuit, in other words when the transistor is between a terminal of the motor and ground.

Figure 4:
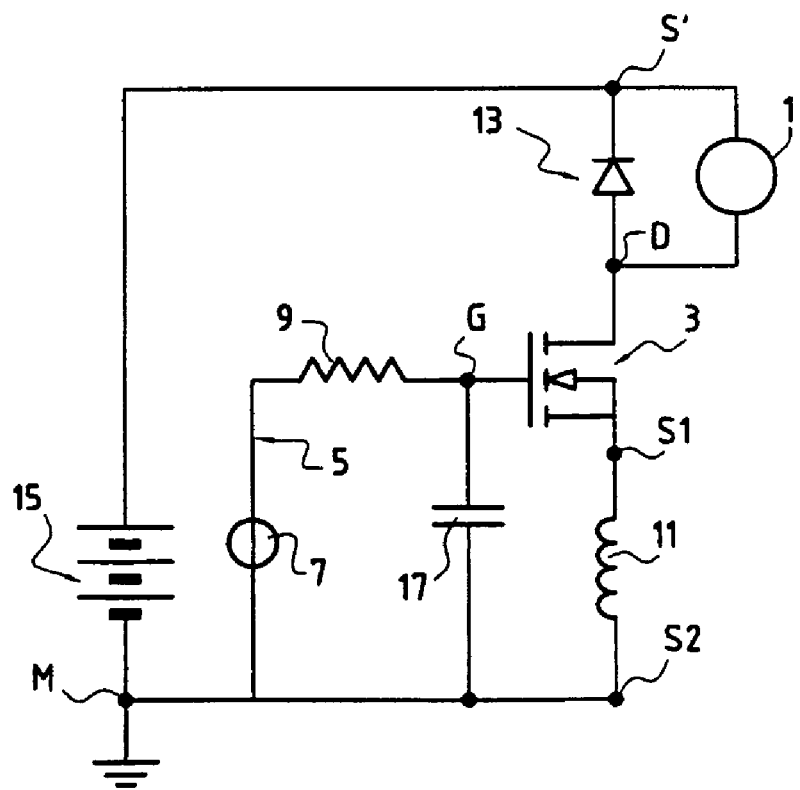
FIG. 4 is another embodiment that differs from FIG. 3 in that it comprises a capacitor.
Figure 5A:
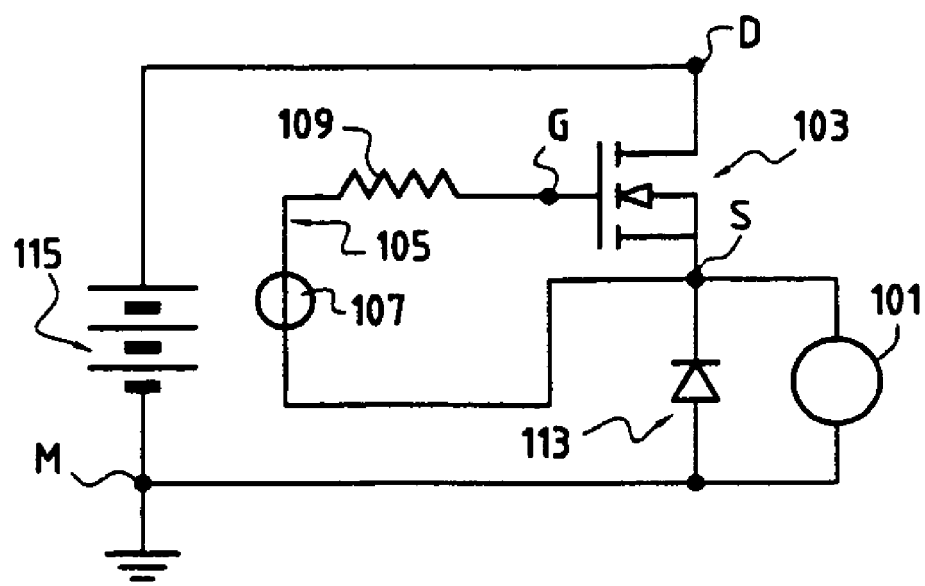
FIGS. 5A and 5B are highly schematic views of speed control systems of a motor according to the prior art.
Figure 5B:
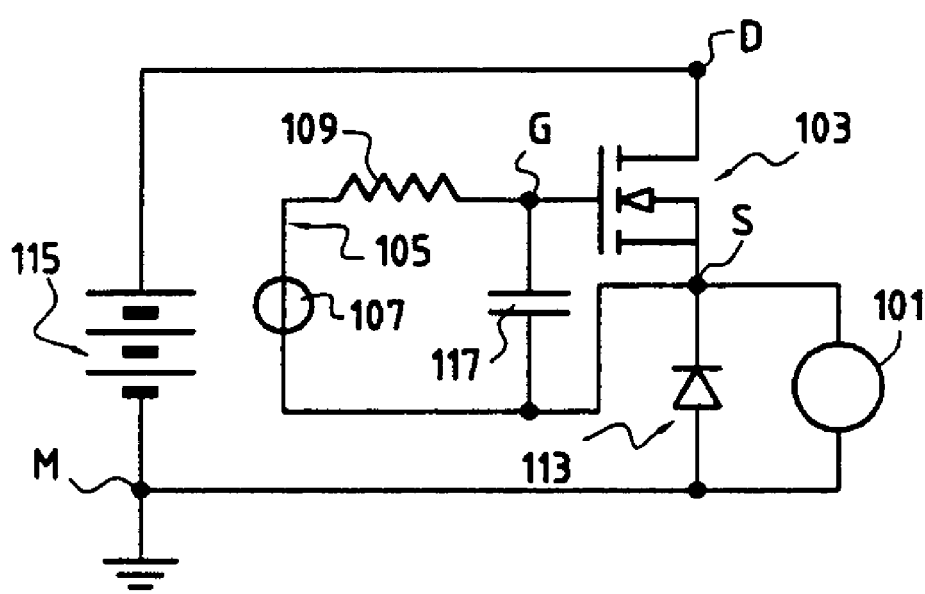

FIG. 4 is yet another embodiment that differs from FIG. 3 in that it comprises a capacitor 17, of capacitance Cgk, connected between the gate G and the second source S2 of the field-effect transistor 3.

The speed control system thus designed can now be easily incorporated into a standard control module of an electric fan unit of a heating and/or air conditioning installation for automobile.

The invention claimed is:

1. System for controlling the speed of a motor (1) of an electric fan unit comprising a field-effect transistor (3) that controls the motor (1) using pulse-width modulation, the field-effect transistor (3) being connected to a circuit (5) comprising a voltage source (7) and a resistive element (9) in series, wherein said circuit (5) is connected between the gate (G) of the field-effect transistor (3) and a second source (S2) that is connected to a first source (S1) of the field-effect transistor (3), via an inductor (11) in order to allow a reduction in the slope of the current as the field-effect transistor (3) switches.

2. System according to claim 1, wherein it also comprises a flywheel circuit (13) connected between ground (M) and the second source (S2) of the field-effect transistor (3), the drain (D) of said field-effect transistor (3) being connected to a power supply source (15).

3. System according to claim 1, wherein it also comprises a flywheel circuit (13) connected between a power supply source (15) and the drain (D) of the field-effect transistor (3), the second source (S2) of said field-effect transistor (3) being connected to ground (M).

4. System according to claim 2, wherein the motor (1) is connected across the terminals of the flywheel circuit (13).

5. System according to claim 3 wherein the motor (1) is connected across the terminals of the flywheel circuit (13).

6. System according to claim 1, wherein the value of the inductor (11) is in the range 5 nH to 30 nH.

7. System according to claim 1, wherein the inductor (11) is formed by a printed circuit board routing between the first source (S1) and the second source (S2) of the field-effect transistor (3).

8. System according to claim 7, wherein the length of the track of the printed circuit board routing is in the range 5 mm to 30 mm.

9. System according to claim 1, wherein the inductor (11) is created by an electronic component.

10. System according to claim 9, wherein the electronic component is a current measurement shunt.

11. System according to claim 1, wherein it also comprises a capacitor (17) connected between the gate (G) and the second source (S2) of the field-effect transistor (3).

12. System according to claim 1, wherein the field-effect transistor (3) is of the MOS type.

13. Control module for an electric fan unit equipped with a speed control system according to claim 1.

14. Heating and/or air conditioning installation for automobile, comprising an electric fan unit equipped with a control module according to claim 13.

* * * * *